United States Patent
Rae

[11] 3,820,269
[45] June 28, 1974

[54] FISHING LURE

[76] Inventor: Albert Thomas Rae, 742 16th St., Courtenay, British Columbia, Canada

[22] Filed: May 25, 1973

[21] Appl. No.: 364,002

[52] U.S. Cl............... 43/42.05, 43/42.33, 43/42.53
[51] Int. Cl............................................ A01k 85/00
[58] Field of Search............ 43/42.33, 42.53, 42.05

[56] References Cited
UNITED STATES PATENTS

| | | | |
|---|---|---|---|
| 1,588,164 | 6/1926 | Brunner | 43/42.53 UX |
| 2,225,676 | 12/1940 | White | 43/42.05 |
| 2,236,353 | 3/1941 | Minser | 43/42.05 |
| 2,300,495 | 11/1942 | Gerhart | 43/42.33 UX |
| 2,670,559 | 3/1954 | Webb et al. | 43/42.33 |

FOREIGN PATENTS OR APPLICATIONS

| 486,258 | 9/1952 | Canada | 43/42.33 |
|---|---|---|---|

*Primary Examiner*—Hugh R. Chamblee
*Assistant Examiner*—Daniel J. Leach
*Attorney, Agent, or Firm*—Fetherstonhaugh & Co.

[57] ABSTRACT

This invention relates to fishing lures made of preserved and/or dehydrated natural baits embedded in clear plastic, and designed to simulate the action of wounded or stunned live baits swimming on their side. The advantages over the use of natural baits in their normal or live state, and the use of artificial lures, is that by the use of baits preserved in their natural state, and embedded in clear plastic appearance, the shape and size of the foods which game fish feed on are retained. Further, all of the advantages of artificial lures such as durability, availability, the ease of storing and using, and the flexibility of movement or action of an artificial lure are achieved. The method of manufacturing such a fishing lure.

3 Claims, 4 Drawing Figures

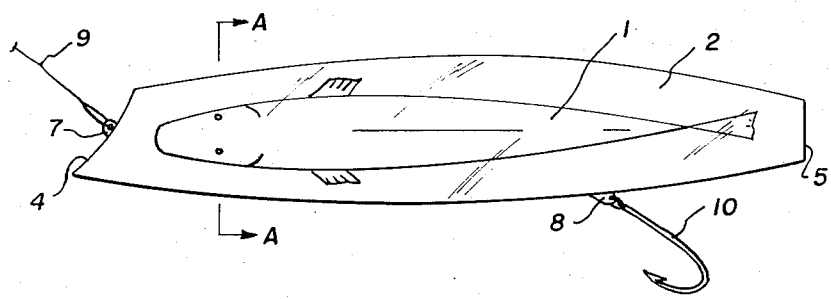
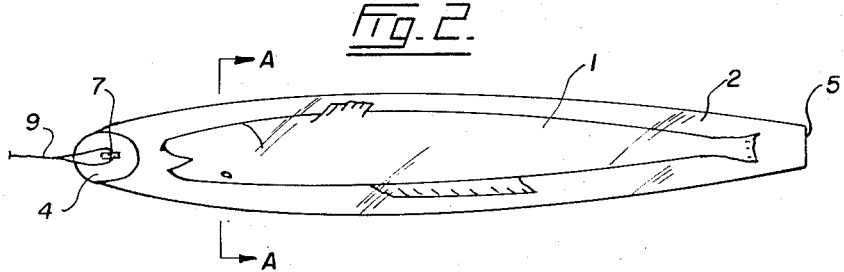
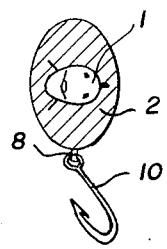
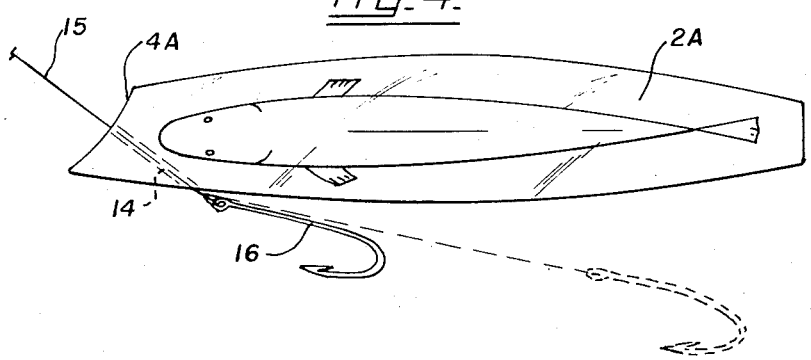

FISHING LURE

This invention relates to a fishing lure made of natural bait embedded in a transparent and castable material such as clear plastic, and designed to simulate the action of wounded live bait.

It is common to use an artificial lure, which is designed and formulated to represent one of the foods which fish naturally feed on, and fish are attracted to the lure in the belief that it is a natural food. It is also common to use natural bait, attached to a hook or hooks for the purpose of catching fish. Both systems have limitations in that, in the case of the artificial lure, design and material limitations do not allow a true and real reproduction of natural bait. In the case of natural bait, it is not always readily available, it is easily lost or damaged by a "strike," or by fouling, and it is difficult to store and use, as it deteriorates very rapidly.

I have found that all of the disadvantages listed above may be overcome by the following process. In reality it is simply reversing the age-old problem of trying to make a lure to resemble natural bait, to processing the natural bait to create an artificial lure. By embedding natural bait in clear castable material I am able to keep the appearance, the shape, and the size of natural bait. The resulting plug-like lure has the advantages of durability, availability, the ease of storing and using, and the flexibility of movement which is required by an artificial lure. The words "natural bait" is intended to identify the natural bait foods or game fish such as herring, minnows, shrimp, etc. The intention of this lure is to provide not only the most realistic lure in appearance, but as a game fish is more likely to attack a wounded prey, this lure is designed to have the embedded bait simulate a wounded prey swimming on its side, rather than in a normal vertical position.

In drawings which illustrate embodiments of the invention:

FIG. 1 is a side view of a fishing lure in accordance with the present invention, FIG. 2 is a top plan view of this embodiment, FIG. 3 is a cross section taken on the line A—A of FIGS. 1 and 2, and FIG. 4 is a side view of another embodiment of the invention.

To successfully ensure that the bait 1, will remain natural in colour, or will not deteriorate or shrink it should be either:

a. First cured in a fixing solution as soon as possible after death to prevent deterioration of the cells, and then placed in dehydration solutions to completely remove all water content of the bait 1, or b. Completely dehydrated by a "freeze drying by sublimitation" process to completely remove all traces of moisture in the bait 1.

When all of the water is removed, the bait 1 is then embedded completely in a castable, transparent material (preferably, clear plastic) to form a body 2 which is shaped to resemble a lure commonly known as a "plug." The embedding is done in a mould (not shown) using conventional casting techniques and to provide a fish-like body 2 having a head end 4 and a tail end 5. The body 2 is oval-shaped in cross-section, see FIG. 3, with the head end 4 being similarly shaped and inclined at an angle to the longitudinal axis of said body as shown best in FIG. 1. In addition, the inclined front end 4 is slightly convex. Thus, when the body 2 is drawn through the water at the end of a line, the body tends to simulate the swimming action of a fish and to remain generally with the major axis of the oval body vertical or as shown best in FIG. 3. The bait, is placed in the mould so as to appear on its side extending across the body 2 substantially parallel to the minor axis thereof. This gives the bait 1 the appearance of a wounded or stunned prey swimming on its side.

Metal or plastic loops 7 and 8 are provided on the body 2, the loops being either partially embedded or attached in some suitable manner. Loop 7 projects forwardly from the centre of the front end 4 and serves to attach a leader 9 or line to the body 2. Loop 8 depends below the body 2 near the tail end 5 thereof and is used for the attachment of a hook 10.

An alternate hook-up for fishing line fastening means is illustrated in FIG. 4. In this particular embodiment of the invention, a body 2A is provided with a hole 14 which extends diagonally through the end 4A to appear on the underside of said body a short distance from said front end. A leader 15 is fitted at one end with a hook 16 and this leader extends freely through the hole 14 with the hook normally supported directly below the body as shown in FIG. 4. Thus, when a fish strikes the lure and is caught by the hook 16, the body 2A tends to slide up the leader 15 out of harm's way.

FIG. 4 also illustrates that front end 4A of this embodiment may be optionally coloured for the purpose of attracting fish.

I claim:

1. A fishing lure comprising a body of transparent castable material, a dehydrated natural bait completely embedded within the body during casting and being clearly visible from the exterior of said body, said body sealing and protecting the natural bait against the deteriorating effects of water, air and repeated handling, said natural bait being preserved fish such as herring, said body having a fish-like shape and an oval-shaped front end inclined at an angle to the longitudinal axis of the body whereby to maintain the major axis of said front end generally vertical when the lure is drawn through the water, and said natural bait being disposed on its side substantially parallel to the minor axis of the front end.

2. A fishing lure as claimed in claim 1, and incuding fastening means for attaching the front end of the body to a fishing line, and a hook secured to the body at a point remote from the fastening means.

3. A fishing lure as claimed in claim 1, and including a leader attached at one end to a fishing line and having a hook secured at the opposite end, said body having a hole extending diagonally therethrough, said leader slidably extending through the hole with the hook normally disposed below the body.

* * * * *